United States Patent
Maiuzzo

(10) Patent No.: US 7,889,021 B2
(45) Date of Patent: Feb. 15, 2011

(54) RECEPTION OF WIDEBAND SIGNALS WITH HIGH TEMPERATURE SUPERCONDUCTING COMPONENTS TO REDUCE CO-SITE INTERFERENCE

(75) Inventor: Michael A. Maiuzzo, Queenstown, MD (US)

(73) Assignee: Sentel Corporation, Alexandria, VA (US)

( * ) Notice: Subject to any disclaimer, the term of this patent is extended or adjusted under 35 U.S.C. 154(b) by 313 days.

(21) Appl. No.: 12/042,124

(22) Filed: Mar. 4, 2008

(65) Prior Publication Data

US 2008/0310480 A1    Dec. 18, 2008

Related U.S. Application Data

(60) Provisional application No. 60/892,963, filed on Mar. 5, 2007.

(51) Int. Cl.
H04B 3/30  (2006.01)
H01P 1/213  (2006.01)

(52) U.S. Cl. .................. 333/12; 333/99 S
(58) Field of Classification Search ............. 333/12, 333/99 S; 505/163, 210, 875, 847; 327/527
See application file for complete search history.

(56) References Cited

U.S. PATENT DOCUMENTS

| | | | | | |
|---|---|---|---|---|---|
| 1,550,684 | A | * | 8/1925 | Espenschied | 327/310 |
| 3,112,452 | A | * | 11/1963 | Kirkpatrick | 327/34 |
| 3,936,761 | A | * | 2/1976 | Jensen et al. | 327/557 |
| 4,396,893 | A | * | 8/1983 | Edson | 333/17.2 |
| 5,339,057 | A | * | 8/1994 | Rauscher | 333/166 |
| 5,838,675 | A | * | 11/1998 | Rauscher | 370/343 |
| 6,107,898 | A | * | 8/2000 | Rauscher | 333/175 |
| 6,549,560 | B1 | * | 4/2003 | Maiuzzo et al. | 375/136 |
| 6,698,224 | B2 | * | 3/2004 | Kagaya et al. | 62/259.2 |
| 7,149,497 | B2 | * | 12/2006 | Kagaya et al. | 455/334 |

* cited by examiner

*Primary Examiner*—Robert Pascal
*Assistant Examiner*—Kimberly E Glenn
(74) *Attorney, Agent, or Firm*—The Marbury Law Group, PLLC

(57) ABSTRACT

A comb limiter combiner for front end filtering reduces bit error rates with an increased reception range. Notch filters are tuned to suppress interfering frequency-hopped signals. An output comb filter suppresses out-of-band intermodulation products generated by any non-linear devices (such as limiters and the notch filters) in each of the comb limiter combiner sub-bands. Sensitivity is further increased by the use of cryogenically cooled high temperature superconductor components for the filters, amplifiers, and limiters used in each sub-band.

13 Claims, 4 Drawing Sheets

RECEPTION OF WIDEBAND SIGNALS WITH HIGH TEMPERATURE SUPERCONDUCTING COMPONENTS TO REDUCE CO-SITE INTERFERENCE

CROSS REFERENCE TO RELATED APPLICATIONS

This application is claims the benefit of Provisional Application No. 60/892,963 filed Mar. 5, 2007. The 60/892,963 application is incorporated by reference herein, in its entirety, for all purposes.

BACKGROUND AND SUMMARY

The military HF, VHF and UHF bands (2 MHz to 500 MHz) span eight octaves in frequency and provide essential communications for naval vessels and land-based vehicles. These bands are also important for electronic warfare (EW) activities which include Signal Intelligence (SIGINT), Electronic Intelligence (ELINT), Information/Operations (I/O), and Electronic Attack (EA). In order to accomplish these EW functions, signal acquisition and direction finding capabilities are important.

Because of electromagnetic interference (EMI) between co-sited communications transmitters and SIGINT/ELINT receivers, the intelligence gathering functions can be very adversely impacted. To provide all of the desired functions, without being impacted by EMI it is important to provide a radio frequency distribution system for distribution of extremely small SIGINT and ELINT signals while also handling I/O, EA and communications signals. The radio frequency distribution system needs to provide a low noise RF path between the antennas and the processing electronics while operating in a high EMI environment.

A signal intelligence (or electronic intelligence) receiver intercepts radio signals at a high sensitivity across a large bandwidth of the radio spectrum. This ability to intercept radio signals may be compromised by noise sources that effectively reduce the physical range from which the signal intelligence receiver can pick signals of interest from their origins. Frequency-hopping, frequency-scanning wideband and ultra-wideband communications receivers cannot employ simple narrowband pre-selector filters to protect amplifiers and limiters in receiver front ends from strong interference outside the communications signal bandwidth. Close proximity to multiple transmitters reduces the effective communications range of such receivers to almost zero. In particular, frequency hop (FH) transmissions add to the complexity of co-site EMI concerns because they add a time dimension to the spectrum management problem.

This range reduction has been shown to be due, at least in part, to intermodulation products in the front end of the receiver. Diodes near the receiver's antenna port used for power limiting or circuit switching act as mixers. The resulting intermodulation products affect virtually every communications channel in the receiver's range. It should be noted that intermodulation products are produced whenever two or more high-power interference signals appear in the same nonlinear device at the same time.

One method that may be used to reduce cosite EMI effects is antenna-to-antenna isolation. Although antenna isolation may appear to be an easy and effective solution to cosite EMI problems, it is often not a feasible solution because it requires space that is not available.

A second method that may be used to reduce cosite EMI effects is preselector filtering. Using a preselector bandpass or band reject filter can be effective, but with frequency hopping systems it is necessary to use a bank of filters such that the signal hops from filter-to-filter. Also, it is necessary to ensure that nonlinear interactions do not occur after the filters.

A third method that may be used to reduce cosite EMI effects is digital signal processing. Superconducting analog-to digital converters have characteristics which are amenable to cancellation of high-level narrowband signals. Extremely high sampling rates are possible with these devices.

Improvement in wideband reception has been provided through the use of multiple bandpass filters with contiguous passbands. For details, refer to U.S. Pat. No. 6,549,560 to Maiuzzo et al. Although the use of multiple bandpass filters has provided substantial improvements in wideband communication receiver performance, this structure has not been modified for use in the context of a receiver for signal/electronic intelligence. Thus, there remains demand for further increased performance, particularly increased range.

Thus, a continued need exists for front end filtering for wide bandwidth receivers providing reduced bit error rates and/or increased reception range.

In an embodiment, a comb limiter combiner for front end filtering provides for reduced bit error rates with an increased reception range. The comb limiter combiner according to one embodiment has an input signal coupler for coupling to a receiving antenna and distributing the antenna signal to a bank of input bandpass filters that each utilize high temperature superconductors cooled cryogenically. The cryogenically cooled input bandpass filters have contiguous passbands that comprise the total receiver bandwidth. Each input bandpass filter is connected to a limiter having a threshold substantially equal to the limiting threshold of the receiver. Each limiter is connected to a cold low noise amplifier. Each amplifier is connected to an output bandpass filter similar to the corresponding input bandpass filter to remove out-of-band intermodulation products generated by the limiter. Each of the output bandpass filters is cryogenically cooled and uses high temperature semiconductors. The bank of output bandpass filters is connected to an output signal coupler for coupling to the front end of the receiver.

A comb limiter combiner according to another embodiment has an input signal coupler for coupling to a receiving antenna and distributing the antenna signal to a bank of input bandpass filters. The input bandpass filters have contiguous passbands that comprise the total receiver bandwidth. Each input bandpass filter is connected to feed into a linear self-adjusting attenuator, and each attenuator is connected to feed into an automated self-tuning notch filter. Each notch filter is connected to input to a low noise amplifier. Each amplifier is connected to an output bandpass filter similar to the corresponding input bandpass filter to remove out-of-band intermodulation products.

A comb limiter combiner according to another embodiment has an input signal coupler for coupling to a receiving antenna and distributing the antenna signal to a bank of cryogenically cooled input bandpass filters. The input bandpass filters have contiguous passbands that comprise the total receiver bandwidth. Each input bandpass filter is connected to feed into a cold linear self-adjusting attenuator, and each attenuator is connected to feed into an automated self-tuning cold notch filter. Each notch filter is connected to input to a cryogenically cooled output bandpass filter similar to the corresponding input bandpass filter to remove out-of-band intermodulation products.

A comb limiter combiner according to yet another embodiment has an input signal coupler for coupling to a receiving antenna and distributing the antenna signal to a bank of input bandpass filters. The input bandpass filters have contiguous passbands that comprise the total receiver bandwidth. Each input bandpass filter is connected to feed into a low power automated notch filter. Each notch filter is connected to feed into a limiting amplifier. Each of the limiting amplifiers is connected to input to an output bandpass filter similar to the corresponding input bandpass filter to remove out-of-band intermodulation products.

One feature of comb limiter combiners according to these embodiments is the use of cryogenically cooled high temperature superconductor band bass filters.

Another feature comb limiter combiners according to these embodiments is the use of cold notch filters to suppress interference.

An advantage of the comb limiter combiners according to these embodiments is that intermodulation products are restricted to the passband of a single bandpass filter.

Another advantage is that a comb limiter combiner design according to these embodiments requires no knowledge of the frequency excursions of the transmitted signal.

Yet another advantage is that a comb limiter combiner design according to these embodiments requires no switching or control circuitry.

DETAILED DESCRIPTION

In various embodiments the comb filter banks at the input and output of the receiver divide the waveforms into different frequency sub-bands in order to conquer the intermodulation problem experienced in wideband RF distribution systems. Each comb limiter combiner (CLIC) sub-band is substantially narrower than 50 MHz. Within each sub-band, the high-power interference is processed to reduce levels to the spurious-free dynamic range of the SIGINT/ELINT receivers. The CLIC accomplishes this without generating significant intermodulation products.

Figure 1:
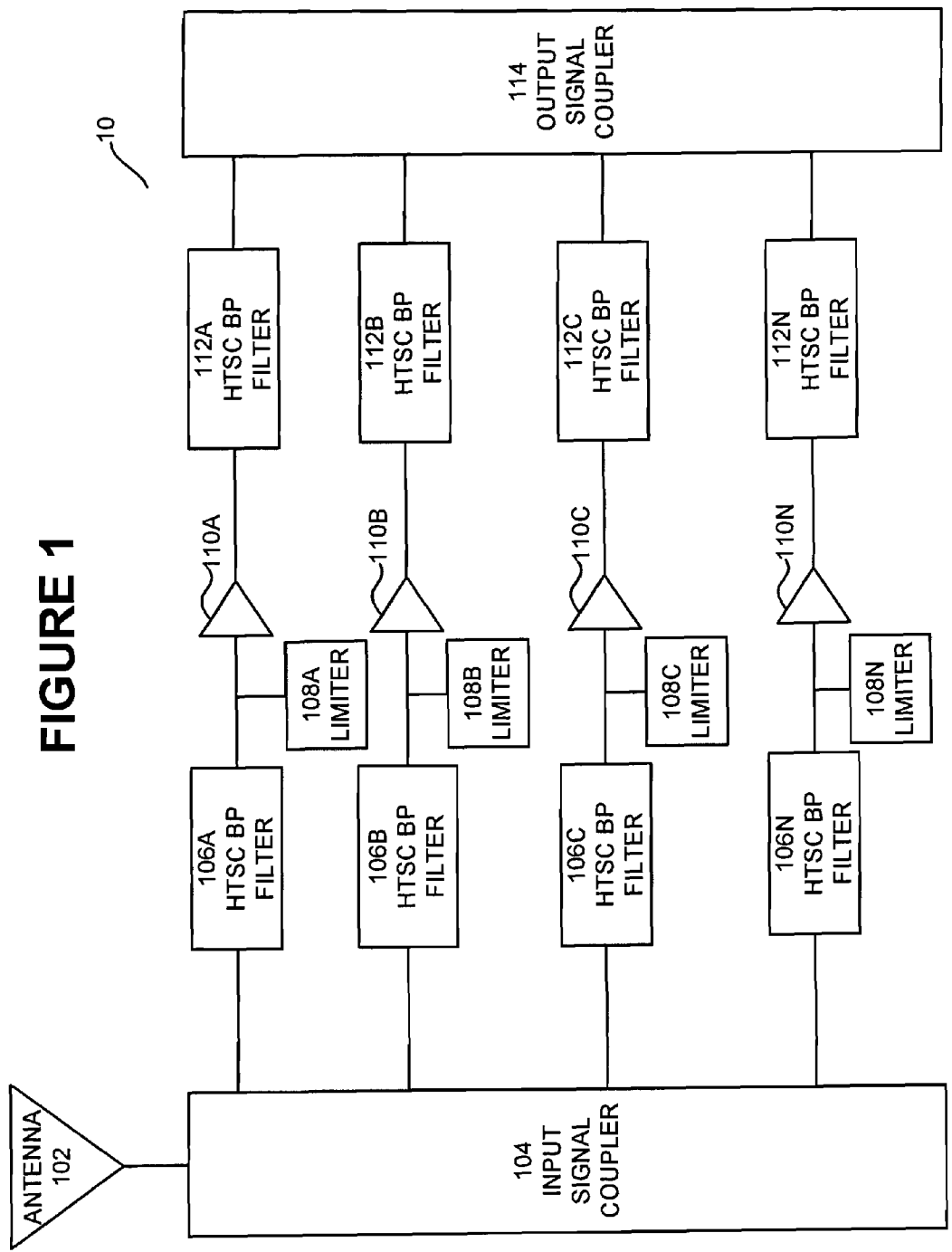
FIG. 1 illustrates a block diagram of a comb limiter combiner according to a first embodiment.

Referring to FIG. 1, an embodiment of a comb limiter combiner 10 is illustrated as being connected to an antenna 102. The antenna 102 (for example, a communications signal antenna) is connected to an input signal coupler 104. The input signal coupler 104 (for example, a power splitter/combiner) distributes the antenna signal to cryogenically cooled high temperature superconductor input bandpass filters 106 (illustrated as 106 A-N). Each input bandpass filter 106 is connected to a limiter 108 (illustrated as 108 A-N). The limiters 108 are each connected to a corresponding cold low noise amplifier (LNA) 110 (illustrated as 110 A-N). The LNAs 110 are each connected to a corresponding cryogenically cooled high temperature superconductor output bandpass filter 112 (illustrated as 112 A-N). The bank of output bandpass filters 112 is connected to output signal coupler 114. An output signal coupler 114 (for example, a power splitter/combiner) is connected to a communications receiver front end, such as a digital communications receiver (not shown).

In operation, each input bandpass filter 106 spans a portion of a wideband or ultra-wideband receiver bandwidth. A receiver communications signal is coupled to the filters 106 from the antenna 102 through the input signal coupler 104. The center frequencies and passbands of the input bandpass filters 106 are selected to match the channel separation of the communications signal and the frequency separation of strong interfering signals. Each input bandpass filter 106 preferably has a bandwidth small enough so that the probability of two or more undesired signals occurring in the same passband is minimized, and has steep roll-off to avoid the generation of significant intermodulation products in adjacent passbands. To cover the entire communications signal bandwidth, the passbands of input bandpass filters 106 generally overlap at the 3 dB points, although this is not meant as a limitation.

Limiters 108 clip peak amplitudes to avoid exceeding the linear response of the receiver front end, typically about +26 dBm. The limiters 108 may be, for example, limiting low-noise amplifiers.

Cold low noise amplifiers 110 are used in conjunction with the limiters 108 to improve the signal-to-noise ratio. The clipped signals from the limiter 108 are input to output bandpass filters 112.

By way of example, output bandpass filters 112 typically have the same center frequency, bandwidth, and frequency rolloff as the respective corresponding input bandpass filters 106 to prevent out-of-band intermodulation products generated by the limiters 108 from being input to the receiver front end.

When one or more interfering signals occur in the bandpass of a single input bandpass filter 106, the corresponding limiter may be captured by the interference and the desired signal degraded through desensitization and/or intermodulation and other nonlinear effects. However, the degradation will be confined to the time periods when the interfering signal frequencies occur in the bandpass of the same input bandpass filter 106 passing the desired signal. Additionally, the intermodulation products are mitigated by the filtering provided by the corresponding output bandpass filter 112.

Alternatively, this embodiment may be implemented with switches substituted for the limiters 108.

The comb limiter combiner according to this embodiment may be designed for virtually any frequency band according to well known techniques of filter and limiter design. The input and output signal couplers may be, for example, a multiport input wherein any incurred losses are compensated by selecting the gain of the limiters 108. Cryogenically cooled types of bandpass filters incorporating high temperature superconductor technology are used.

Figure 2:
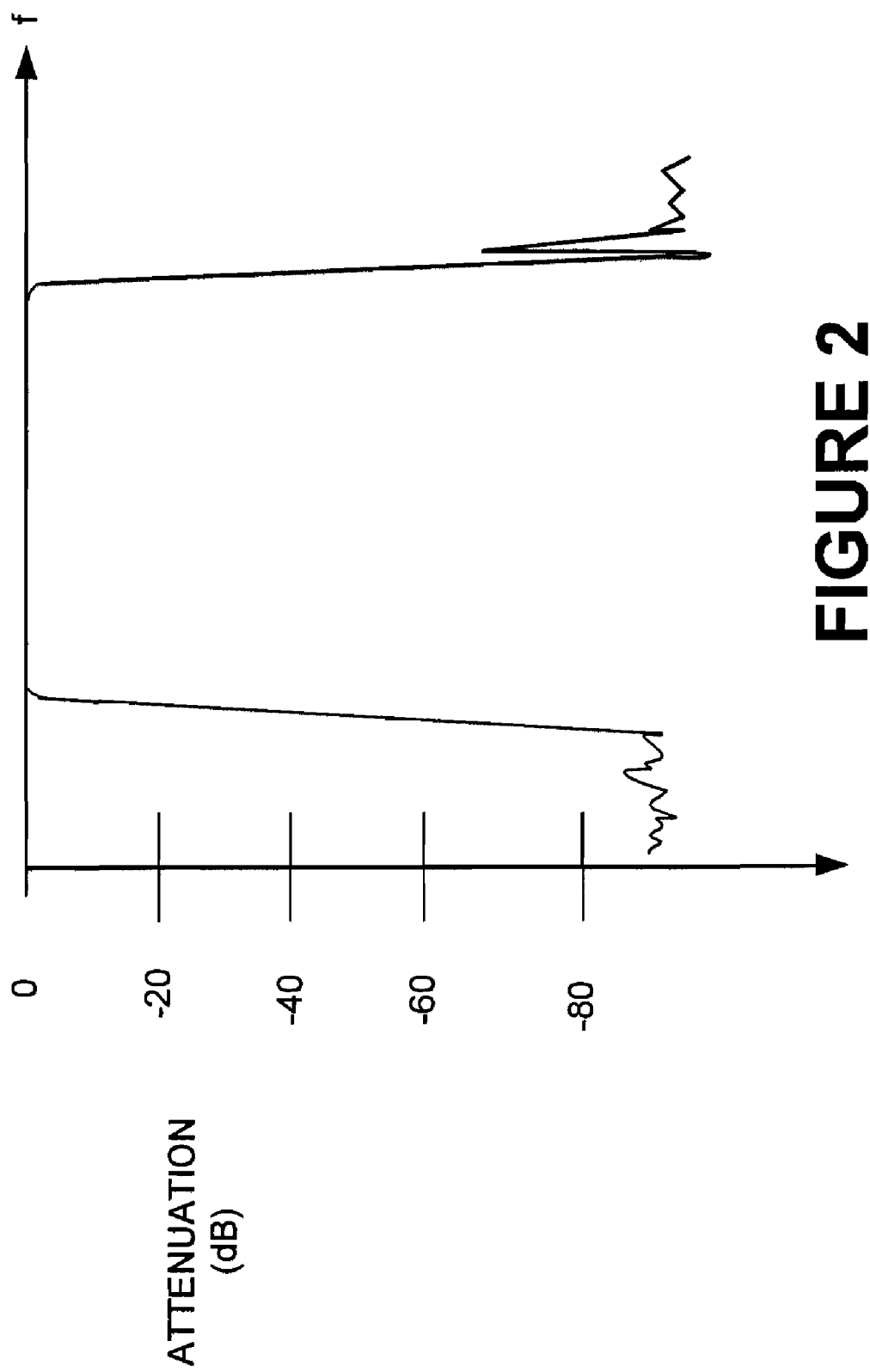
FIG. 2 illustrates a response curve of a cryogenically cooled bandpass filter as utilized in a comb limiter combiner according to the first embodiment.

Referring to FIG. 2, a frequency response curve is illustrated for a cryogenically cooled high temperature superconductor (HTS) bandpass filter as utilized in a comb limiter combiner according to the first example. The filter provides attenuation in excess of 80 dB outside of the pass band, and the roll-off (or "skirt") for the filter's response is steep so as to provide a crisp delineation between adjacent pass bands. The filter also eliminates band edge spurious effects.

Figure 3:
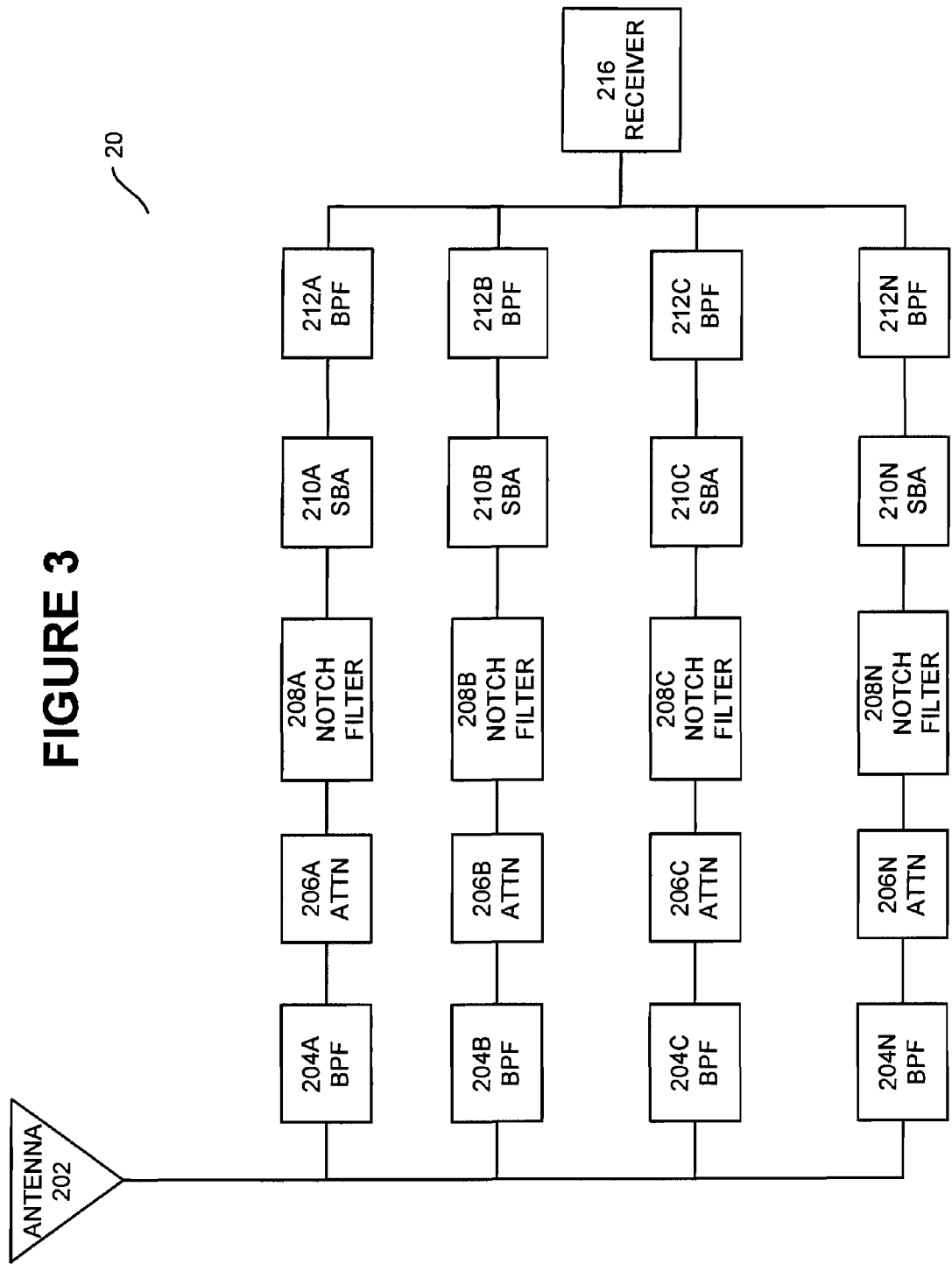
FIG. 3 illustrates a block diagram of a comb limiter combiner according to a second embodiment.

Referring to FIG. 3, a block diagram of a comb limiter combiner 20 according to a second example is illustrated. A radio frequency distribution system configuration for VHF communications systems includes cryogenically cooled HTS bandpass filters 204 A-N to divide the VHF band received from an antenna 202 into a number of sub-bands, notch filters 208 A-N, and a cryogenically cooled HTS output bandpass filters 212 A-N to filter any intermodulation products that may have been generated in the notch filters. This structural configuration illustrates a comb limiter combiner technology that utilizes cryogenic cooling of certain components and the use of notch filters 208 A-N.

In an embodiment, more than one bandpass filter is used per sub-band to attenuate high level EMI signals. In another embodiment, at the input of the radio frequency distribution system the cryogenically cooled HTS bandpass filters 204 A-N have contiguous passbands and route the incoming signals into one of the sub-band amplifiers (SBAs) 210 A-N. The SBAs 210 A-N may be broadly conceptualized as being limiting amplifiers since they inherently have a limited range of linear operation. Multiple narrowband signals in a nonlinear device result in intermodulation products being generated and potentially masking many communications channels. The cryogenically cooled HTS bandpass filters 204 A-N make negligible the probability that more than one signal appears in any one amplifier at any given instant. After passing through one of the filters, any high-power interference signals are reduced by attenuators (or power limiters) 206 A-N and/or notch filters 208 A-N. Low-level desired signals will be amplified then passed through cryogenically cooled HTS output bandpass filters A-N, which will remove any undesired intermodulation products generated in SBAs 210 A-N, attenuators (or power limiter) 206 A-N or notch filters 208 A-N. The signals are then routed into receiver 216.

Tunable notch filters 208 A-N are used as a part of the solution for suppression of EMI from co-sited frequency hop transmitters. However, tunable filters employ nonlinear components for tuning (e.g., varactor diodes and PIN diode switches), which can generate further EMI. This potential problem is eliminated by using a feature inherent in the comb limiter combiner (CLIC) structure. The RF distribution architecture according to this example may be used for SIGINT or ELINT receivers and incorporates the notch filters 208 A-N in the CLIC sub-bands. As a result, intermodulation is substantially eliminated, and when it does occur is band limited. With this structural configuration, intermodulation can occur only when multiple interferers are tuned in the same CLIC sub-band.

Each sub-band contains a notch filter (i.e., a frequency dependent limiter) 208 A-N, an attenuator 206 A-N that precedes and protects the notch filter 208 A-N from overload, and a sub-band amplifier 210 A-N following the notch filter 208 A-N. A front end power limiter (not shown) is optionally also used if the projected interference level is envisioned to pose a risk of causing component damage. In an embodiment, n individual attenuator 206 A-N and a notch filter 208 A-N may be bypassed whenever high-power signals do not appear in the sub-band. The notch filter 208 A-N may use a tune word from the collocated transmitter. Alternatively, frequency-measurement devices, set to measure the frequency of a high power carrier in each sub-band, might also be employed to direct the tuning of the notch. The notch filter reduces the EMI level from one interferer to the spurious-free dynamic range of the SIGINT/ELINT receivers. If more than one high level signal is present, then the attenuator 206 A-N will be adjusted to limit the signals to a level within the spurious-free dynamic range of the receiver. Thus, few (if any) significant intermodulation or other spurious products will be generated in the SIGINT/ELINT receivers.

Figure 4:
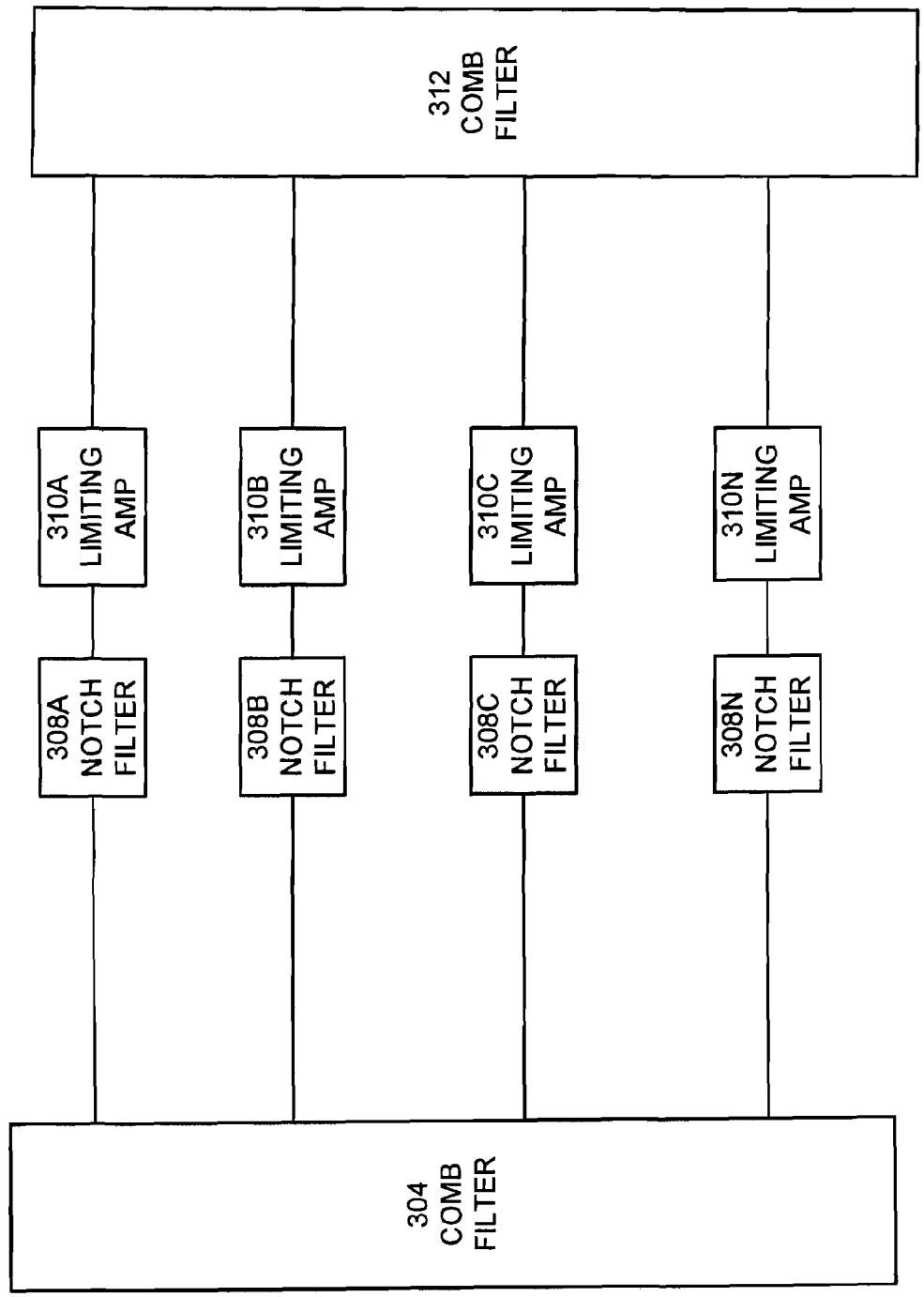
FIG. 4 illustrates a block diagram of a comb limiter combiner according to a third embodiment.

Referring to FIG. 4, a comb limiter combiner according to a third example is illustrated. The structure according to this third example is similar to that of the second example, except for omission of the attenuators. The attenuators may optionally be omitted if there is deemed to be an acceptably low risk of the notch filters being damaged by overload and there is negligible chance of multiple high power signals in a sub-band. Received signals are coupled into a comb filter 304 formed by a bank of band pass filters with contiguous pass bands. In each of the channels formed by the comb filter the output of the band pass filter is coupled into a low power automated notch filter 308 (illustrated as 308 A-N), followed by a limiting amplifier 310 (illustrated as 310 A-N). After being filtered and amplified, the signal is fed into a second comb filter 312, formed by a bank of band pass filters with pass bands corresponding to those at the input of their respective channels, and then combined for input to the receiver.

Alternatively, the amplifiers 210, 310 illustrated in FIGS. 3 and 4 respectively may optionally be omitted if cryogenic components are used and it is determined that there is sufficiently low loss between the antenna and the receiver. Because the cryogenically cooled HTS components have lower loss and higher Q factors than conventional filter components, the amplifiers may not be necessary and are omitted according to an optional configuration.

High temperature superconductors (HTS) are useful in implementing filter circuits of the comb linear combiner as described above. HTS technology is attractive for use in RF applications because, although the surface resistance of a superconductor material (for example, $YBa_2Cu_3O_7-\delta$ or "YBCO") is not zero at radio frequencies (as opposed to the DC resistance of a superconductor, which is essentially zero), it is typically several orders of magnitude lower than that of even cryo-cooled copper. At typical communications frequencies, YBCO provides at least a 1,000-fold reduction in surface resistance. With such a material, resonators have quality factors far in excess of those fabricated from conventional materials. Filters with unloaded resonator Q's in excess of 100,000 are commercially available and routinely used in cellular communications base stations, for example.

Resonators with extremely high quality factors result in the ability to make filters with very little insertion loss, even with multiple poles in the filter. Placing such a filter in a receiver front end provides for maximum frequency selectivity and maximum receiver sensitivity at the same time. The unique properties of superconducting filters provide for these filters to have extraordinarily steep "skirts," that is, extremely rapid fall-off in transmission outside the band of interest, while having a very low insertion loss. This extremely sharp-skirted aspect of these superconducting filters is very useful for protecting relatively wideband spectra.

Further advantages are realized by the ability to combine HTS filter technology with cryogenically cooled semiconductor amplifiers (typically Gallium Arsenide Field Effect Transistors or "GaAs FETs") to provide an overall low-noise front end for a receiver. The reduction in amplifier noise performance, coupled with the inherent low noise of the HTS filters themselves, results in front-end sensitivity that represents a significant improvement over known structures.

The HTS filters make possible such filtering performance into the microwave range and, thus, extend the usefulness of comb limiter combiner technology to frequency ranges much higher than had been previously feasible (for example, for K-band and Ku-band microwave satellite communications applications).

It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A comb limiter combiner for suppression of electromagnetic interference with a signal received via an antenna comprising:
   a plurality of receiver channels, wherein each of the receiver channels receives the signal and wherein each of the receiver channels comprises:
   an input bandpass filter connected to the antenna;
   a linear self-adjusting attenuator connected to the input bandpass filter to reduce amplitudes;
   a self-tuning notch filter connected to the attenuator;
   a low noise amplifier connected to the notch filter, wherein the low noise amplifier amplifies the received signal; and
   an output bandpass filter connected to the low noise amplifier to attenuate intermodulation products, the output bandpass filter being connected to an output node,
   wherein the comb limiter combiner couples the amplified received signal from each of the plurality of receiver channels through the output node.

2. The comb limiter combiner of claim 1, wherein each of the input bandpass filters and each of the corresponding output bandpass filters have a substantially equal center frequency, bandwidth, and frequency roll-off, said input and output bandpass filters being matched to receive a respective one of the plurality of receiver channels, and wherein the input bandpass filters of each of the plurality of receiver channels have contiguous frequency roll-offs that overlap at frequencies substantially equal to 3 dB points of said input bandpass filters.

3. The comb limiter combiner of claim 1, wherein the self-tuning notch filter is tuned based upon a tune word.

4. The comb limiter combiner of claim 1, wherein:
   the input bandpass filter comprises a cryogenically cooled high temperature superconductor bandpass filter,
   the self-tuning notch filter comprises a cryogenically cooled high temperature superconductor notch filter,
   the low noise amplifier comprises a cryogenically cooled high temperature superconductor amplifier, and
   the output bandpass filter comprises a cryogenically cooled high temperature superconductor bandpass filter.

5. A comb limiter combiner for suppression of electromagnetic interference with a signal received via an antenna comprising:
   a plurality of receiver channels, wherein each of the receiver channels receives the signal and wherein each of the receiver channels comprises:
   a cryogenically cooled high temperature superconductor input bandpass filter connected to the antenna;
   a linear self-adjusting attenuator connected to the input bandpass filter to reduce amplitudes;
   a cryogenically cooled high temperature superconductor self-tuning notch filter connected to the attenuator; and
   a cryogenically cooled high temperature superconductor output bandpass filter connected to the notch filter to attenuate intermodulation products, the output bandpass filter being connected to an output node,
   wherein the comb limiter combiner couples a filtered received signal from each of the plurality of receiver channels through the output node.

6. The comb limiter combiner of claim 5, wherein each of the input bandpass filters and each of the corresponding output bandpass filters have a substantially equal center frequency, bandwidth, and frequency roll-off, the input and output bandpass filters being matched to receive a respective one of the plurality of receiver channels, and wherein the input bandpass filters of each of the plurality of receiver channels have contiguous frequency roll-offs that overlap at frequencies substantially equal to 3 dB points of said input bandpass filters.

7. The comb limiter combiner of claim 5, wherein the self-tuning notch filter is tuned based upon a tune word.

8. A comb limiter combiner for suppression of electromagnetic interference with a signal received via an antenna comprising:
   a plurality of receiver channels, wherein each of the receiver channels receives the signal and wherein each of the receiver channels comprises:
   an input bandpass filter connected to the antenna;
   a low power automated notch filter connected to the input bandpass filter to attenuate interference;
   a limiting amplifier connected to the notch filter, wherein the limiting amplifier amplifies the received signal; and
   an output bandpass filter connected to the low noise amplifier to attenuate intermodulation products, the output bandpass filter being connected to an output node,
   wherein the comb limiter combiner couples the amplified received signal from each of the plurality of receiver channels through the output node.

9. The comb limiter combiner of claim 8, wherein each of the input bandpass filters and each of the corresponding output bandpass filters have a substantially equal center frequency, bandwidth, and frequency roll-off, said input and output bandpass filters being matched to receive a respective one of the plurality of receiver channels, and wherein the input bandpass filters of each of the plurality of receiver channels have contiguous frequency roll-offs that overlap at frequencies substantially equal to 3 dB points of the input bandpass filters.

10. The comb limiter combiner of claim 8, wherein the self-tuning notch filter is tuned based upon a tune word.

11. The comb limiter combiner of claim 8, wherein:
    the input bandpass filter comprises a cryogenically cooled high temperature superconductor bandpass filter,
    the low power automated notch filter comprises a cryogenically cooled high temperature superconductor notch filter,
    the limiting amplifier comprises a cryogenically cooled high temperature superconductor amplifier, and
    the output bandpass filter comprises a cryogenically cooled high temperature superconductor bandpass filter.

12. A comb limiter combiner for frequency-hopped communications comprising:
    an input signal coupler, wherein the input signal coupler receives a frequency-hopped signal;
    a plurality of cryogenically cooled high temperature superconductor input bandpass filters connected to the input signal coupler and dividing the signal into sub-bands;
    a plurality of cryogenically cooled high temperature superconductor limiters respectively connected to the plurality of input bandpass filters for clipping peak amplitudes of each of the sub-band signals above a critical value;
    a plurality of cryogenically cooled high temperature superconductor notch filters connected to the plurality of limiters for attenuating interfering frequency-hopped signals within each of the sub-band signals;
    a plurality of cryogenically cooled high temperature superconductor output bandpass filters corresponding to the input bandpass filters respectively connected to the plurality of limiters for attenuating intermodulation products within each of the sub-band signals; and an output signal coupler connected to the plurality of output bandpass filters, wherein the output signal coupler combines the sub-band signals to produce a filtered frequency-hopped signal, wherein each of the input bandpass filters and each of the corresponding output bandpass filters have a substantially equal center frequency, bandwidth, and frequency roll-off, the input and output bandpass filters being matched to receive a respective sub-band channel of a frequency-hopped transmitted signal, and wherein the plurality of input bandpass filters have contiguous frequency roll-offs that overlap at frequencies substantially equal to 3 dB points of the input bandpass filters.

13. The comb limiter combiner of claim 12, wherein the notch filters are tuned based upon a tune word.

* * * * *